US012258055B2

United States Patent
Benoit-Levy et al.

(10) Patent No.: US 12,258,055 B2
(45) Date of Patent: *Mar. 25, 2025

(54) SYSTEM AND METHOD FOR RAILWAY WEEDING

(71) Applicant: BILBERRY SAS, Gentilly (FR)

(72) Inventors: Aurelien Benoit-Levy, Gentilly (FR); Loic Steunou, Gentilly (FR); Hugo Serrat, Gentilly (FR)

(73) Assignee: Bilberry SAS, Gentilly (FR)

( * ) Notice: Subject to any disclaimer, the term of this patent is extended or adjusted under 35 U.S.C. 154(b) by 925 days.

This patent is subject to a terminal disclaimer.

(21) Appl. No.: 17/413,240

(22) PCT Filed: Dec. 16, 2019

(86) PCT No.: PCT/EP2019/085431
§ 371 (c)(1),
(2) Date: Jun. 11, 2021

(87) PCT Pub. No.: WO2020/120802
PCT Pub. Date: Jun. 18, 2020

(65) Prior Publication Data
US 2022/0076065 A1     Mar. 10, 2022

(30) Foreign Application Priority Data
Dec. 14, 2018   (EP) ..................... 18020639

(51) Int. Cl.
*B61L 23/04*      (2006.01)
*E01H 11/00*    (2006.01)
(Continued)

(52) U.S. Cl.
CPC ............. *B61L 23/041* (2013.01); *B61L 23/04* (2013.01); *E01H 11/00* (2013.01); *G06F 18/214* (2023.01);
(Continued)

(58) Field of Classification Search
CPC .......... G06T 2207/20081; G06V 20/56; G06V 20/50; G06F 18/214; G06F 18/28;
(Continued)

(56) References Cited

U.S. PATENT DOCUMENTS 11,071,991 B2 *  7/2021  Serrat ................. G06F 18/2413
11,377,806 B2 *  7/2022  Day ..................... G06V 20/188
(Continued)

FOREIGN PATENT DOCUMENTS

WO    WO-2004005625 A1 *  1/2004  ............. E01H 11/00

*Primary Examiner* — Zachary L Kuhfuss
*Assistant Examiner* — Cheng Lin

(57) ABSTRACT

A weeding system for a railway weeding vehicle including at least one camera for mounting on a railway vehicle to acquire an image of a portion of a railway track while the railway vehicle is moving. The system also includes a spraying unit to be mounted on the railway vehicle, a control unit to receive images from the camera, generate a weed species detection signal and selectively cause the spraying of a chemical agent on the basis of the weed species detection signal. The control unit executes a training-based algorithm based on a set of reference images labeled to indicate the presence or not of at least one weed species in the images.

11 Claims, 2 Drawing Sheets

(51) Int. Cl.
*G06F 18/214* (2023.01)
*G06F 18/28* (2023.01)
*G06N 20/00* (2019.01)
*G06V 20/56* (2022.01)

(52) U.S. Cl.
CPC ............ *G06F 18/28* (2023.01); *G06N 20/00* (2019.01); *G06V 20/56* (2022.01)

(58) Field of Classification Search
CPC ......... G06N 20/00; E01H 11/00; B61L 23/04; B61L 23/041
See application file for complete search history.

(56) References Cited

U.S. PATENT DOCUMENTS

| | | | |
|---|---|---|---|
| 11,473,256 B2* | 10/2022 | Bassfeld | B61D 15/00 |
| 11,492,770 B2* | 11/2022 | Bassfeld | B05B 9/06 |
| 2009/0226036 A1* | 9/2009 | Gaal | A01M 7/0089 |
| | | | 382/103 |
| 2020/0167972 A1* | 5/2020 | Birnhack | G06N 3/045 |
| 2022/0071192 A1* | 3/2022 | Benoit-Levy | A01M 21/043 |

* cited by examiner

SYSTEM AND METHOD FOR RAILWAY WEEDING

FIELD OF THE INVENTION

This invention generally relates to the field of automated weed treatment for railways.

BACKGROUND OF THE INVENTION

Document WO2018141995A1 in the name of the present applicant discloses a weeding system for a railway weeding vehicle, comprising one or several cameras adapted to be mounted on a vehicle to acquire digital images of a portion of a railway track during vehicle travel, a spraying unit adapted to be mounted on said railway vehicle and comprising at least two supply modules with a chemical agent tank, a driven delivery valve and at least one nozzle to spray the chemical agent from a supply module, and a controller module able to receive a weed species detection signal and to selectively command the spraying of chemical agent based on said signal.

The system further comprises a weed species identification unit with a plurality of parallel processing cores each adapted to perform convolution operations a sub-matrix constructed from nearby pixels of the image and a predefined kernel to obtain a feature representation sub-matrix of the pixel values of the image, the unit being adapted to compute probability of presence of weed species from a feature representation matrix of the image constructed from the feature representation sub-matrices generated by the processing cores, and to generate a weed species detection signal based on said probability of presence.

Such system relies on high quality images of the railway area, that are processed in real-time by a machine-learning based process in order to locate specific weed species.

Such known system generally involves that the images are taken with sufficient light conditions, which basically restricts its use to day time.

It would however be desirable to have a system that can be used in low light conditions, such as at night with artificial light, without requiring extremely high lighting power.

In particular, railway tracks are available for maintenance mainly during the night, and it would be desirable, esp. for environmental reasons, to limit the intensity of artificial light used by the system.

SUMMARY OF THE INVENTION

The present invention aims at providing a system with training-based plant recognition that can be used effectively and reliably in low light conditions.

To this end, the present invention provides according to a first aspect a weeding system for a railway weeding vehicle, comprising:
  at least one camera adapted to be mounted on a railway vehicle to acquire an image of a portion of a railway track while said railway vehicle is travelling on a train track, said image comprising a matrix of pixel values,
  a spraying unit adapted to be mounted on said railway vehicle,
  a control unit adapted to receive images from said camera, generate a weed species detection signal and selectively cause the spraying of a chemical agent by the spraying unit on the basis of said weed species detection signal,
  the control unit being adapted to execute in a running mode a training-based algorithm, the training being based on a set of reference images labeled so as to indicate the effective presence or not of at least one weed species in said images, characterized in that each of said reference images comprises a pair of a so-called nighttime image and a so-called daytime image of the same scene, in that said labeling is performed on the daytime images and applied to the corresponding nighttime images, in that the training is based on the labeled nighttime images, and in that in the running mode, the algorithm receives nighttime real images.

Preferred but optional aspects of this system comprise the following features, taken individually or in any technically-compatible combinations:
  a species contouring is performed on the daytime images and applied to the corresponding nighttime image for training the weed recognition algorithm.
  each pair of a reference daytime image and nighttime image comprises two images of a same scene taken by the same camera under different lighting conditions.
  each pair of a reference daytime image and nighttime image comprises two images of a same scene taken by the same camera under different settings.
  said settings comprise at least one among shutter speed setting and aperture setting.
  the nighttime image of the pair further results from a filtering of the corresponding daytime image so as to simulate nighttime artificial lighting conditions.
  each pair of a reference daytime image and nighttime image comprises a real nighttime image and a simulated daytime image generated from said nighttime image by means of a training-based conversion algorithm.
  said conversion algorithm is executed on raw Bayer images from a digital camera.
  said conversion algorithm is trained by pairs of real day time and nighttime images of the same scene in raw Bayer mode.

According to a second aspect, the present invention provides a method for training a training-based weed recognition algorithm for use in a railway weeding vehicle, the railway vehicle comprising:
  at least one camera adapted to acquire an image of a portion of a railway track while said railway vehicle is travelling on a train track, said image comprising a matrix of pixel values,
  a spraying unit,
  a control unit adapted to receive running-mode nighttime images from said camera, generate a weed species detection signal and selectively cause the spraying of a chemical agent by the spraying unit on the basis of said weed species detection signal,
the method comprising training the weed recognition algorithm based on pairs of a so-called daytime image and a so-called nighttime image of the same scene, the training comprising the following steps:
  determining a label from each daytime image of a pair based on the presence or not of weed species in said daytime image,
  assigning said label of the corresponding nighttime image of the same pair,
  using the labeled nighttime images for training the weed recognition algorithm.

The method may include the same preferred but optional additional features as above.

Finally, the present invention provides a weed treatment method for use in a railway weeding vehicle, the railway vehicle comprising:

at least one camera adapted to acquire an image of a portion of a railway track while said railway vehicle is travelling on a train track, said image comprising a matrix of pixel values, a spraying unit, a control unit adapted to receive running-mode nighttime images from said camera, generate a weed species detection signal and selectively cause the spraying of a chemical agent by the spraying unit on the basis of said weed species detection signal, the method comprising applying to the acquired images the weed recognition algorithm trained by the method as defined above.

BRIEF DESCRIPTION OF THE DRAWINGS

Other aims, features and advantages of the present invention will appear more clearly from the following detailed description of preferred embodiments thereof, made with reference to the appended drawings in which.

DETAILED DESCRIPTION OF PREFERRED EMBODIMENTS

Figure 1:
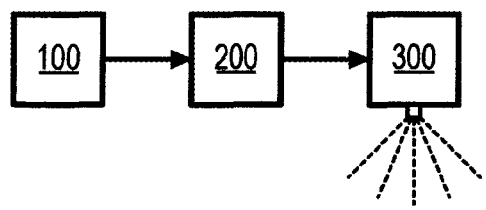
FIG. 1 diagrammatically illustrates a weed treatment system for implementation of the present invention.

Referring to FIG. 1, a system for weed recognition according to the present invention comprises a data acquisition unit 100, a central processing unit 200 and a spraying unit 300. In a manner known per se, the central processing unit receives digital images taken on a regular basis by data acquisition unit 100, executes an algorithmic processing based on prior learning to identify in the images weed to be destroyed, as well as the location of the weed in the images, and controls one or several sprayers corresponding to the weed location so as to spray an herbicide or other chemical agent on the weed. A practical implementation of the system is described e.g. in WO2018141995A1 in the name of the same applicant, the contents of which is incorporated by reference and to which the skilled person will refer as necessary.

In a manner known per se, the learning process comprises a labelling or tagging step. In this step, reference images similar to the ones that will be taken by the acquisition unit in the running mode of the system are taken and labelled.

These labeled reference images are then used in a training step, in which a learning algorithm essentially learns how to distinguish between an undesirable weed species and a different item in an image. The result of this training step can be in one particular implementation a collection of kernel weights, corresponding to various convolutions used in the algorithm. Details of this training process and the learning algorithm are provided in particular in WO2018141995A1.

In the running mode, for each image taken, a set of weights is determined from the convolutions using the kernel weights and is representative of the positions of the weed plants in the image, as well as the probability that they indeed are weed plants. Again, WO2018141995A1 provides details of the processing.

It is easily understood that the labeling step is essential to the reliability of the detection: one must be able to say with great accuracy what is weed and what is not weed in the training images. This accuracy can be greatly compromised when the system will operate in low light conditions such as by night, implying that the reference images should also be low light condition images and thus difficult to label.

The present invention provides different approaches to tackle this problem.

First Approach—First Implementation

Figure 2A:
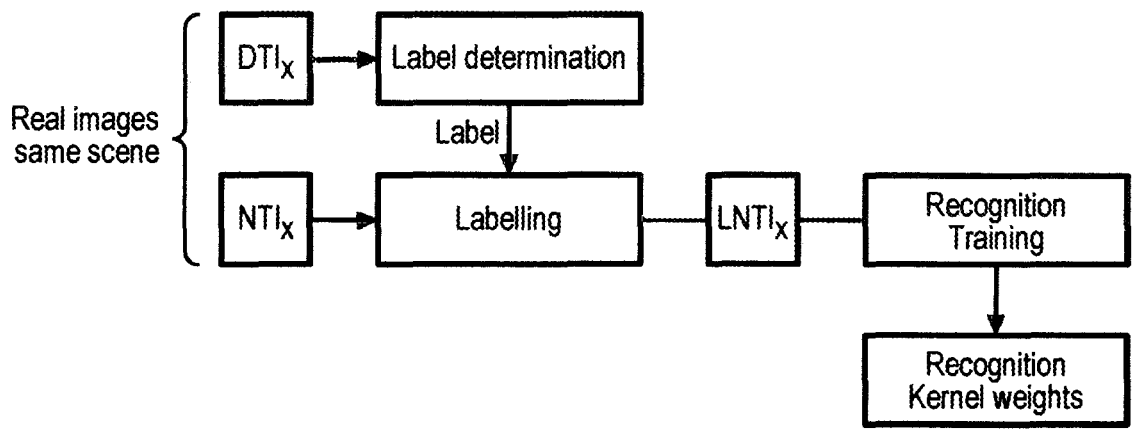
FIGS. 2A and 2B illustrate a process according to a first implementation of a first approach of the present invention

In a first implementation of the first approach of the present invention and referring to FIG. 2A, each reference image provided as an input to the learning process is duplicated, two images of exactly the same scene being taken under different light conditions.

In this case, this is achieved by taking a first image during daytime (daytime image DTIx), leaving the camera in place and taking a second image of the same scene during night time (corresponding nighttime image NTIx). Each daytime image DTIx is used for label determination (typically presence or absence of at least one weed species), and the corresponding nighttime image NTIx is labelled identically (labeled nighttime image LNTIx). These images are used as input for the recognition training, as illustrated, this training allowing to determine recognition kernel weights. Labelling can be single-class, multi-class, and basically includes binary information about the presence or absence of weed species in general, or the distinctive presence or absence of different weed species. In more sophisticated approaches, labeling can include quantified information.

Labelling can be manual, semi-automated (computer-based but human-validated labeling proposal), or automated.

Figure 2B:
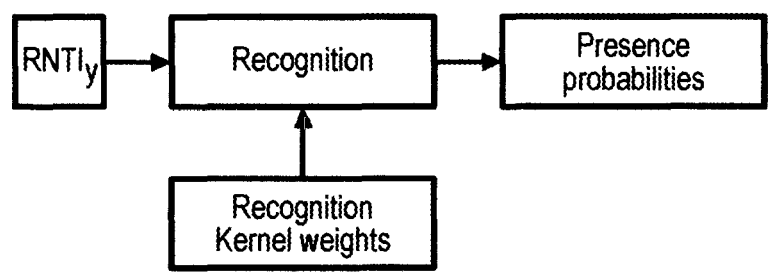

Referring to FIG. 2B, the running mode nighttime images RNTIy taken during displacement of the system are applied to the recognition process which is fed with the recognition kernel weights as generated above.

It should be noted here that the nighttime reference images NTIi used for the training should be acquired in conditions similar to those acquired in the running mode. In particular, should the running mode provide some artificial lighting, then the nighttime reference images should preferably be taken with a similar artificial lighting.

First Approach—Second Implementation

Figure 3:
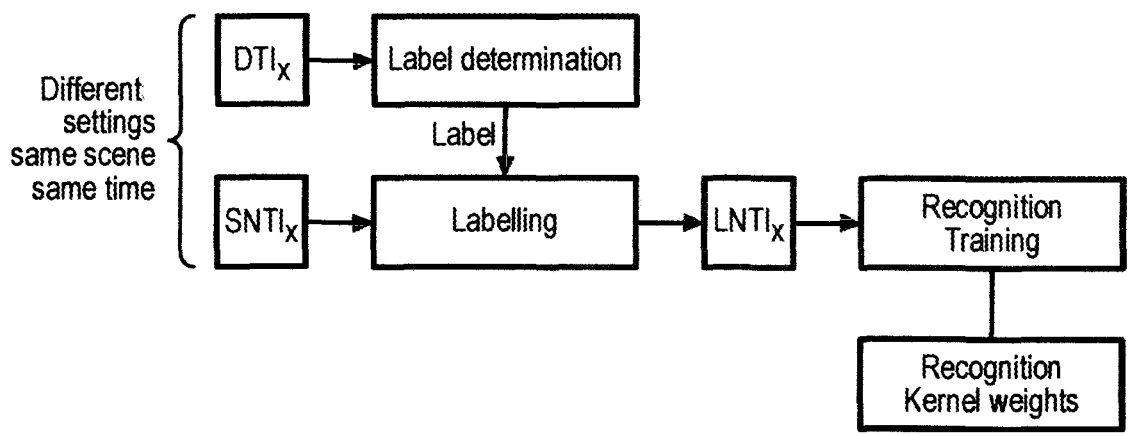
FIG. 3 illustrates a part of a process according to a second implementation of a first approach of the present invention.

In a second implementation, and referring to FIG. 3, the reference image duplication may be achieved by taking a daytime image DTIx of the scene in normal camera settings conditions, then changing the camera settings to reduce the exposure (aperture and/or shutter speed), and taking a second daytime image of the same scene with the reduced exposure setting so as to simulate a nighttime condition, such image being designated as SNTIx.

For that purpose, the shutter speed and/or aperture for simulating a night time image will be selected so that the quantity of light received by the image sensor will be of the same order or magnitude as the quantity of light received by the sensor in the running mode in nighttime condition, as determined by the running mode shutter speed.

For instance, the running mode images are taken with an exposure time Texp which is selected so that the images generated during the train displacement by night are sharp enough for performing the recognition process. This exposure time typically is from 0.5 to 5 milliseconds depending on the image sensor characteristic features and the actual conditions (presence of artificial light, moonlight).

In such case, the darker reference images are taken with an exposure time such that a quantity of light similar to the one received in the running mode is obtained (typically around 0.1 to 0.2 millisecond again depending on the image sensor characteristic features and the actual conditions (presence of artificial light, moonlight).

The subsequent steps of the process are similar to the ones of the first implementation: the daytime image DTIx is used for label determination, and the labeled simulated nighttime image LNTIx is used for the recognition training.

The recognition itself can be performed according to FIG. 2B.

In this first approach, each daytime reference image may be used for contouring the representation of the species, by contouring techniques known per se, that can be automated, such contouring being applied to the corresponding nighttime image for facilitating the recognition in the training step.

Preferably, the capture of the reference images in the first implementation is automated in order to collect daytime and nighttime images of the same scene without staff having to wait for hours until the light conditions change.

In addition, if in the running mode of the system artificial light is used, then the same artificial light, esp. in terms of color temperature and light intensity, is used for the reference nighttime images.

In this second implementation, the camera settings changes may comprise reduced aperture, in combination with a reduced exposure time or in replacement of a reduced exposure time.

In addition, a filtering (optical or digital) can be used in order to improve the simulation of the nighttime conditions, in particular when artificial light is used.

Alternatively, the reference image duplication may be achieved by taking a nighttime image NTIx of the scene in normal camera settings conditions, then changing the camera settings to increase the exposure (aperture and/or shutter speed), and taking a nighttime image of the same scene with the increased exposure setting so as to simulate a daytime condition and generate a "simulated daytime image", such image being designated as SDTIx.

In still another alternative approach, the simulated daytime image can be generated by digital processing of the nighttime image so as to make it brighter, with an appropriate adjustment of the intensity/color parameters of the nighttime image. In such case, only one take is necessary.

It will be noted that, throughout the present specification, the term "daytime image" covers real daytime images as well as simulated daytime images obtained as explained above or according to the second approach explained below.

Second Approach

Figure 4A:
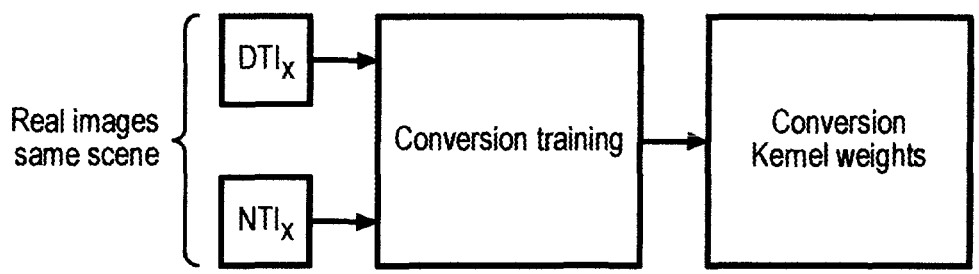
FIGS. 4A and 4B illustrate parts of a process according to a second approach of the present invention.
Figure 4B:
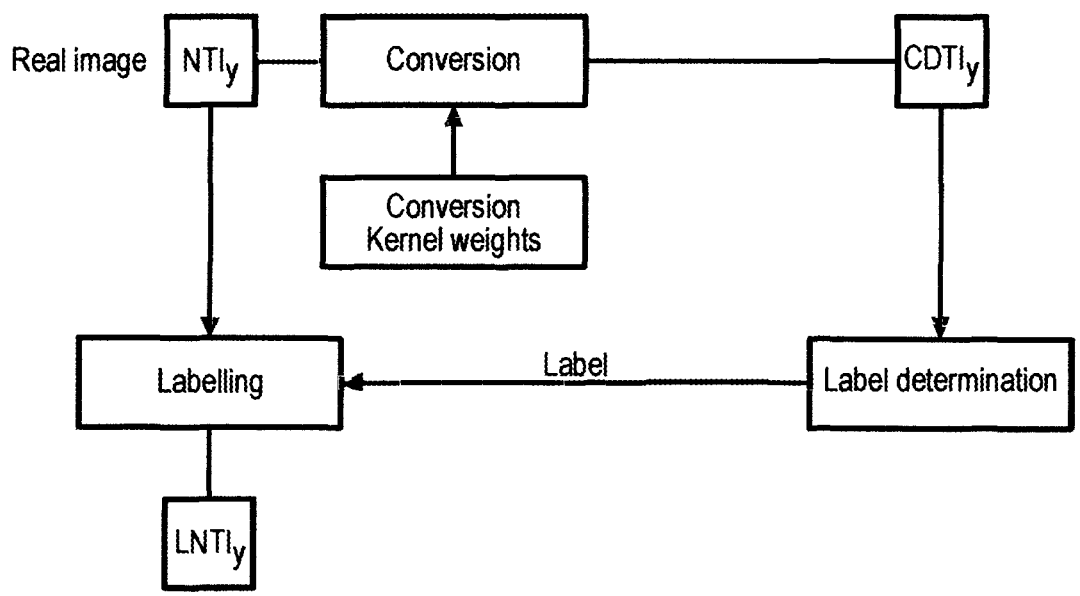

Referring now to FIGS. 4A and 4B, a second approach of the present invention comprises building a training-based conversion algorithm in order to specifically convert nighttime images that are taken in nighttime conditions into daytime images. Such algorithm can be based for instance on the disclosure available at https://arxiv.org/abs/1805.01934, presented at CVPR2018 conference.

In this approach the night-to-day conversion algorithm is trained using a pair of reference images comprising a day time image and a night time image of the same scene.

As illustrated in FIG. 4A, this conversion training uses as an input matching pairs of real night/day images DTIx, NTIx such as obtained according to the first approach above (first or second implementation) and allows generating conversion kernel weights which, when used in convolution operations applied to the nighttime image NTIx of a pair, will lead to a converted (simulated) daytime image CDTIx which is as close as possible to the corresponding real daytime image DTIx.

Referring to FIG. 4B, the conversion algorithm once trained allows converting a nighttime image NTIy into a corresponding converted daytime image CDTIy. The latter is then used for the label determination step as described above (again being much easier to perform than on the nighttime image), the label being applied to the corresponding nighttime image.

Then the labeled nighttime images are used for the recognition training, and the thus obtained recognition kernel weights are used for the recognition in the running mode (cf. FIGS. 2A and 2B).

Preferably, the daytime and nighttime reference images are exploited in their Bayer (raw) format, as it has proven by experimentation that the training is at least as efficient with such image format, upstream of any calibration intended to suit the image to the human eye.

This allows substantially decreasing the processing power needed for treating the images, allowing to achieve real time operation more easily, and/or allowing an increase of the image capture rate in the system.

Of course, the present invention is not limited to the described embodiments, but the skilled person will be able to derive, using his general knowledge, numerous variations.

In particular, other algorithms than those based on convolutions with matrices of kernel weights can be used for the recognition and conversion processes.

The invention claimed is:

1. A weeding system for a railway weeding vehicle, comprising:
   at least one camera adapted to be mounted on a railway vehicle to acquire an image of a portion of a railway track while said railway vehicle is travelling on a train track, said image comprising a matrix of pixel values,
   a spraying unit adapted to be mounted on said railway vehicle,
   a control unit adapted to receive images from said camera, generate a weed species detection signal and selectively cause the spraying of a chemical agent by the spraying unit on the basis of said weed species detection signal,
   the control unit being adapted to execute in a running mode a training-based algorithm, the training being based on a set of reference images labeled so as to indicate the effective presence or not of at least one weed species in said images,
   wherein each of said reference images comprises a pair of a nighttime image and a daytime image of the same scene, said labeling is performed on the daytime images and applied to the corresponding nighttime images, the training is based on the labeled nighttime images, a species contouring is performed on the daytime images and applied to the corresponding nighttime image for training the algorithm, and in the running mode, the algorithm receives nighttime real images.

2. A system according to claim 1, wherein each pair of a reference daytime image and nighttime image comprises two images of a same scene taken by the same camera under different lighting conditions.

3. A system according to claim 1, wherein each pair of a reference daytime image and nighttime image comprises two images of a same scene taken by the same camera under different settings such as shutter speed setting and aperture setting.

4. A system according to claim 3, wherein the nighttime image of the pair further results from a filtering of the corresponding daytime image so as to simulate nighttime artificial lighting conditions.

5. A weeding system for a railway weeding vehicle, comprising:
- at least one camera adapted to be mounted on a railway vehicle to acquire an image of a portion of a railway track while said railway vehicle is travelling on a train track, said image comprising a matrix of pixel values,
- a spraying unit adapted to be mounted on said railway vehicle,
- a control unit adapted to receive images from said camera, generate a weed species detection signal and selectively cause the spraying of a chemical agent by the spraying unit on the basis of said weed species detection signal,
- the control unit being adapted to execute in a running mode a training-based algorithm, the training being based on a set of reference images labeled so as to indicate the effective presence or not of at least one weed species in said images,
- wherein each of said reference images comprises a pair of a nighttime image and a daytime image of the same scene, said labeling is performed on the daytime images and applied to the corresponding nighttime images, the training is based on the labeled nighttime images, and in the running mode, the algorithm receives nighttime real images,
- wherein each pair of a reference daytime image and nighttime image comprises a real nighttime image and a simulated daytime image generated from said nighttime image by means of a training-based conversion algorithm, and
- wherein said conversion algorithm is executed on raw Bayer images from a digital camera and trained by pairs of real day time and nighttime images of the same scene in raw Bayer mode.

6. A method for training a training-based weed recognition algorithm for use in a railway weeding vehicle, the railway vehicle comprising:
- at least one camera adapted to acquire an image of a portion of a railway track while said railway vehicle is travelling on a train track, said image comprising a matrix of pixel values,
- a spraying unit,
- a control unit adapted to receive running-mode nighttime images from said camera, generate a weed species detection signal and selectively cause the spraying of a chemical agent by the spraying unit on the basis of said weed species detection signal,
- the method comprising training the weed recognition algorithm based on pairs of a daytime image and a nighttime image of the same scene, the training comprising the following steps:
  - determining a label from each daytime image of a pair based on the presence or not of weed species in said daytime image,
  - assigning said label of the corresponding nighttime image of the same pair,
  - using the labeled nighttime images for training the weed recognition algorithm, and
  - determining a weed species contour from each daytime image of a pair, said contour being applied to the corresponding nighttime image.

7. A method according to claim 6, wherein each pair of a reference daytime image and nighttime image comprises two images of a same scene taken by the same camera under different lighting conditions.

8. A method according to claim 6, wherein each pair of a reference daytime image and nighttime image comprises two images of a same scene taken by the same camera under different settings such as shutter speed setting and aperture setting.

9. A method according to claim 8, wherein the nighttime image of the pair further results from a filtering of the corresponding daytime image so as to simulate nighttime artificial lighting conditions.

10. A weed treatment method for use in a railway weeding vehicle, the railway vehicle comprising:
- at least one camera adapted to acquire an image of a portion of a railway track while said railway vehicle is travelling on a train track, said image comprising a matrix of pixel values,
- a spraying unit,
- a control unit adapted to receive running-mode nighttime images from said camera, generate a weed species detection signal and selectively cause the spraying of a chemical agent by the spraying unit on the basis of said weed species detection signal,
- the method comprising applying to the acquired images the weed recognition algorithm trained by the method according to claim 6.

11. A method for training a training-based weed recognition algorithm for use in a railway weeding vehicle, the railway vehicle comprising:
- at least one camera adapted to acquire an image of a portion of a railway track while said railway vehicle is travelling on a train track, said image comprising a matrix of pixel values,
- a spraying unit,
- a control unit adapted to receive running-mode nighttime images from said camera, generate a weed species detection signal and selectively cause the spraying of a chemical agent by the spraying unit on the basis of said weed species detection signal,
- the method comprising training the weed recognition algorithm based on pairs of a so-called daytime image and a so-called nighttime image of the same scene, the training comprising the following steps:
  - determining a label from each daytime image of a pair based on the presence or not of weed species in said daytime image,
  - assigning said label of the corresponding nighttime image of the same pair,
  - using the labeled nighttime images for training the weed recognition algorithm,
  - wherein each pair of a reference daytime image and nighttime image comprises a real nighttime image and a simulated daytime image generated from said nighttime image by means of a training-based conversion algorithm, and
- wherein said conversion algorithm is executed on raw Bayer images from a digital camera and is trained by pairs of real day time and nighttime images of the same scene in raw Bayer mode.

\* \* \* \* \*